(12) United States Patent
Crowe et al.

(10) Patent No.: US 7,497,045 B1
(45) Date of Patent: Mar. 3, 2009

(54) FISHING WEIGHT SYSTEM AND METHOD

(76) Inventors: Ross Crowe, 4620 Highway 53, Ray, MN (US) 56669; Jarren B. Mills, 15485 Drexel Way, Apple Valley, MN (US) 55124

( * ) Notice: Subject to any disclaimer, the term of this patent is extended or adjusted under 35 U.S.C. 154(b) by 300 days.

(21) Appl. No.: 11/339,321

(22) Filed: Jan. 25, 2006

Related U.S. Application Data (60) Provisional application No. 60/650,704, filed on Feb. 7, 2005, provisional application No. 60/646,943, filed on Jan. 25, 2005.

(51) Int. Cl.
*A01K 85/00* (2006.01)
*A01K 85/01* (2006.01)
*A01K 95/00* (2006.01)

(52) U.S. Cl. .................. 43/42.22; 43/42.39; 43/42; 43/42.06; 43/43.14

(58) Field of Classification Search ........... 43/42.22, 43/42.39, 42, 42.06, 42.24, 42.09, 43.14
See application file for complete search history.

(56) References Cited

U.S. PATENT DOCUMENTS

| | | | | |
|---|---|---|---|---|
| 2,274,596 | A * | 2/1942 | Fink | 43/42.22 |
| 2,827,376 | A * | 3/1958 | Breuer | 43/42 |
| 2,869,279 | A * | 1/1959 | Pretorius | 43/42.06 |
| 2,874,048 | A * | 2/1959 | Walldov | 43/42.06 |
| 3,192,662 | A * | 7/1965 | Hoyle | 43/44.91 |
| 3,500,576 | A * | 3/1970 | Ostrom | 43/42.09 |
| 3,638,347 | A * | 2/1972 | Kochevar | 43/42.39 |
| 3,684,519 | A * | 8/1972 | Combs | 43/42.06 |
| 3,685,192 | A * | 8/1972 | Stibbard | 43/42.24 |
| 3,724,117 | A * | 4/1973 | Flanagan, Jr. | 43/42.39 |
| 3,846,931 | A * | 11/1974 | Block et al. | 43/42.24 |
| 3,852,907 | A * | 12/1974 | Haught | 43/43.14 |
| 3,875,302 | A * | 4/1975 | Inoue | 426/1 |
| 3,988,479 | A * | 10/1976 | Stephan et al. | 426/1 |
| 4,094,087 | A * | 6/1978 | Carpenter | 43/42.24 |
| 4,133,134 | A * | 1/1979 | Cheng | 43/42.06 |
| 4,362,748 | A * | 12/1982 | Cox | 426/1 |
| 4,389,805 | A * | 6/1983 | Hargrave | 43/43.14 |
| 4,530,179 | A * | 7/1985 | Larew | 43/42.06 |
| 4,704,286 | A * | 11/1987 | Rittschof et al. | 426/1 |
| 4,731,247 | A * | 3/1988 | Wolford et al. | 426/1 |
| 4,780,981 | A * | 11/1988 | Hayward et al. | 43/44.89 |
| 4,783,928 | A * | 11/1988 | Weaver | 43/42.24 |
| 4,826,691 | A * | 5/1989 | Prochnow | 43/42.39 |
| 4,875,305 | A * | 10/1989 | Bridges | 43/42.06 |
| 4,887,376 | A * | 12/1989 | Sibley et al. | 43/42.06 |
| 4,887,377 | A * | 12/1989 | Morris | 43/42.24 |
| 4,901,466 | A * | 2/1990 | Davis | 43/4 |
| 4,927,643 | A * | 5/1990 | D'Orazio et al. | 43/42 |
| 4,962,609 | A * | 10/1990 | Walker | 43/42.06 |
| 5,089,277 | A * | 2/1992 | Prochnow | 426/1 |

(Continued)

FOREIGN PATENT DOCUMENTS

GB     2179664 A  *  3/1987

(Continued)

*Primary Examiner*—Darren W Ark
(74) *Attorney, Agent, or Firm*—Kinney & Lange, P.A.

(57) ABSTRACT

A weighting material for use with fishing tackle includes a gel base material and a distributed tungsten filler material suspended in the gel base material. The weighting material can be applied to a fishing tackle article to provide weighting.

3 Claims, 6 Drawing Sheets

U.S. PATENT DOCUMENTS

| | | | | |
|---|---|---|---|---|
| 5,119,581 | A * | 6/1992 | Rudolph | 43/42.22 |
| 5,197,219 | A * | 3/1993 | Cook et al. | 43/42 |
| 5,245,783 | A * | 9/1993 | Cumiskey | 43/42.37 |
| 5,266,323 | A * | 11/1993 | Guthrie et al. | 523/124 |
| 5,270,044 | A * | 12/1993 | Fulmer et al. | 43/42.06 |
| 5,277,918 | A * | 1/1994 | Rawlins | 426/1 |
| 5,333,405 | A * | 8/1994 | Bowles | 43/42.06 |
| 5,393,537 | A * | 2/1995 | Rawlins | 426/1 |
| 5,438,790 | A * | 8/1995 | Rigney | 43/42.24 |
| 5,459,959 | A * | 10/1995 | Paradis | 43/44.89 |
| 5,505,939 | A * | 4/1996 | Keenan | 43/42.06 |
| 5,537,770 | A * | 7/1996 | Storm et al. | 43/42.22 |
| 5,588,246 | A * | 12/1996 | Hill | 43/42.06 |
| 5,659,994 | A * | 8/1997 | Cutter et al. | 43/44.98 |
| 5,664,363 | A * | 9/1997 | Keenan | 43/42.06 |
| 5,674,518 | A * | 10/1997 | Fajt | 424/408 |
| 5,747,665 | A * | 5/1998 | Thompson | 44/265 |
| 5,815,978 | A * | 10/1998 | Huddleston | 43/42.39 |
| 5,827,551 | A * | 10/1998 | Prochnow et al. | 43/42.06 |
| 5,894,693 | A * | 4/1999 | Davie | 43/42.39 |
| 5,912,029 | A * | 6/1999 | Spickelmire | 43/42.06 |
| 5,941,010 | A * | 8/1999 | Latwesen | 43/42 |
| 6,009,657 | A * | 1/2000 | Morton et al. | 43/42 |
| 6,032,401 | A * | 3/2000 | King | 43/42.06 |
| 6,073,383 | A * | 6/2000 | Line | 43/42.24 |
| 6,079,146 | A * | 6/2000 | Larsen | 43/42.06 |
| 6,145,239 | A * | 11/2000 | Hirahara et al. | 43/42.34 |
| 6,176,033 | B1 * | 1/2001 | Latwesen | 43/42 |
| 6,210,798 | B1 * | 4/2001 | Sandor et al. | 428/364 |
| 6,226,918 | B1 * | 5/2001 | Rigney | 43/42.24 |
| 6,671,997 | B2 * | 1/2004 | Lindgren | 43/44.98 |
| 6,827,930 | B2 * | 12/2004 | Cobb et al. | 43/42.06 |
| 6,843,986 | B1 * | 1/2005 | McMaster | 43/42.06 |
| 6,912,808 | B1 * | 7/2005 | Mak | 43/42.39 |
| 7,226,484 | B2 * | 6/2007 | Chen | 43/42 |
| 7,260,913 | B2 * | 8/2007 | Becker | 43/42.39 |
| 2003/0159328 | A1 * | 8/2003 | Acker | 43/42.37 |
| 2005/0155271 | A1 * | 7/2005 | Holy | 43/44.98 |
| 2005/0204607 | A1 * | 9/2005 | Nichols | 43/42.39 |
| 2007/0036746 | A1 * | 2/2007 | Hester et al. | 43/42 |
| 2007/0144055 | A1 * | 6/2007 | Warczok et al. | 43/42.24 |
| 2007/0175084 | A1 * | 8/2007 | Moffitt | 43/42.24 |
| 2008/0202017 | A1 * | 8/2008 | Gregory | 43/42.39 |

FOREIGN PATENT DOCUMENTS

| | | | | |
|---|---|---|---|---|
| JP | 08089145 | A | * | 4/1996 |
| JP | 08200998 | A | * | 8/1996 |
| JP | 08298905 | A | * | 11/1996 |
| JP | 2000154256 | A | * | 6/2000 |
| JP | 2000166423 | A | * | 6/2000 |
| JP | 2001069876 | A | * | 3/2001 |
| JP | 2001069891 | A | * | 3/2001 |
| JP | 2001086903 | A | * | 4/2001 |
| JP | 2001238571 | A | * | 9/2001 |
| JP | 2001245556 | A | * | 9/2001 |
| JP | 2001299152 | A | * | 10/2001 |
| JP | 2003265072 | A | * | 9/2003 |
| JP | 2003339278 | A | * | 12/2003 |
| JP | 2004043700 | A | * | 2/2004 |

* cited by examiner

FISHING WEIGHT SYSTEM AND METHOD

CROSS-REFERENCE TO RELATED APPLICATION(S)

This application claims priority to U.S. Provisional Application Ser. No. 60/646,943 by Ross Crowe and Jarren Mills, entitled "Fishing Weight System," and U.S. Provisional Application Ser. No. 60/650,704 by Ross Crowe and Jarren Mills, entitled "Fishing Weight System," which are both hereby incorporated by reference in their entireties.

BACKGROUND OF THE INVENTION

The present invention relates to fishing tackle articles, fishing tackle weighting substances and methods of weighting fishing tackle articles.

A variety of fishing tackle articles are known that utilize selective weighting to provide desired buoyancy characteristics. For example, jigs are known that include a lead head portion formed around a hook. Lead is a dense material that allows the jig to have a relatively large mass, which can enable the jig to sink even when bait or other articles are attached to the jig. Lead is also frequently used as a weighting material with other fishing tackle articles to provide, for example, decreased buoyancy or a desired falling (i.e., sinking) orientation, which can enhance the effectiveness of the tackle. However, the use of lead has numerous disadvantages.

First, lead is a toxic material and its use with fishing tackle articles leads to environmental pollution. Fishing tackle articles are frequently lost, and the introduction of lead to bodies of water from lost fishing tackle is a significant concern in maintaining the environmental quality of critical natural resources. Lead exposure can have detrimental effects on organisms, and such exposure can result in lead buildup in organisms living that utilize lead-polluted waters. It is desired to avoid lead pollution by avoiding the use of lead in fishing tackle articles.

Second, although lead is a soft metal, it is relatively hard compared to conventional "soft plastic" materials used to make fishing tackle articles like soft plastic worm baits. Hard materials can decrease the effectiveness of fishing tackle articles, particularly fishing lures and baits. Fish that initially strike a lure having a hard weighted portion, such as a conventional jig having a lead weight portion, may reject the lure based on the hardness (or texture) of the weighted portion. It is therefore desired to provide more effective fishing tackle articles.

Suitable alternative weighting materials are not readily available. Other potential materials are generally less dense, making them less suitable for many fishing applications. Other materials also exhibit the same disadvantages as lead, namely toxicity and hardness. Moreover, the high cost of many alternative weighting materials may be prohibitive in the context of fishing applications.

BRIEF SUMMARY OF THE INVENTION

A weighting material for use with fishing tackle according to the present invention includes a gel base material and a distributed tungsten filler material suspended in the gel base material. The weighting material can be applied to a fishing tackle article to provide weighting.

DETAILED DESCRIPTION

The present invention generally relates to fishing tackle articles that utilize a distributed tungsten (also called wolfram) weighting material to provide weighting. As used herein, the term "fishing tackle article" refers to any article for using with fishing, and includes baits, lures, weights, floats, and the like. Tungsten is a non-toxic material, and is significantly more environmentally-friendly than known weighting materials like lead. According to the present invention, a tungsten weighting material can be distributed in another material, such as soft polymer materials (e.g., conventional "soft plastic" materials) and gels. The tungsten weighting material acts as a high-density filler to add mass. A variety of fishing lures, for example, can be made with a soft body having one or more regions that include a distributed tungsten weighting material. Such lures provide desired weighting characteristics without the need for relatively hard weights that could otherwise decrease the lure's effectiveness. A distributed tungsten weighting material can also be selectively applied to portions of an existing fishing tackle articles to provide desired weighting.

The tungsten weighting material is preferably a powder, although small flakes and other small, differently shaped particles can also be used. The tungsten weighting material can be pure tungsten, a tungsten alloy or powder that contains tungsten particles (pure or alloys) as well as particles of other materials. However, the tungsten weighting material is preferably made primarily of tungsten, with only small amounts of other non-toxic materials. The tungsten weighting material is also preferably made of a material having small particle sizes, such that the individual particles are not large enough to be readily detected by a fish.

The tungsten powder is distributed as a suspension in a binder or carrier material. The binder material can be a polymer material, such as vinyl plastisol, or a gel (e.g., MegaStrike™ brand gel-form fish attractant). By combining different amounts of tungsten powder and binder material, a desired density can be achieved. It is possible to achieve a density of up to about 15 g/cm$^3$ for the combined tungsten powder and binder material.

Suitable tungsten powders include the Technon® brand family of tungsten powders, available from Tungsten Heavy Powder, Inc., San Diego, Calif. For instance, Technon® Plus tungsten powder is a high-density spheroidal powder in a Hydrogen-reduced condition. Technon® Plus powder comprises a minimum of about 99.5% tungsten (W), a maximum of about 0.05% iron (Fe), a maximum of about 0.05% nickel (Ni), a maximum of about 0.20% molecular oxygen (O$_2$) and a maximum of about 0.35% other elements total (e.g., Co, Cr, Cu, Mo, Zn). Particle sizes for Technon® Plus powder are 40 microns or larger for at least about 90% of the particles, and at least about 90% of the particles are between 100 and 400 Mesh. Technon® Plus powder has a bulk density of about 18.75 g/cm$^3$ or greater (helium pycnometer measurement) and a tap density of about 11.50 g/cm$^3$ or greater (ASTM B527 measurement).

Technon® Ultra is a high-density spheroidal tungsten powder. Technon® Ultra powder comprises a minimum of about 99.30% tungsten (W), a maximum of about 0.05% iron (Fe), a maximum of about 0.05% nickel (Ni), a maximum of about 0.50% molecular oxygen (O$_2$) and a maximum of about 0.50% other elements (total). Particle sizes for Technon® Ultra powder are 40 microns or larger for at least about 90% of the particles, and at least about 90% of the particles are between 100 and 400 Mesh. Technon® Ultra powder has a bulk density of about 18.50 g/cm$^3$ or greater (helium pycnometer measurement) and a tap density of about 11.25 g/cm$^3$ or greater (ASTM B527 measurement).

Technon® PM is a high-density spheroidal tungsten alloy powder. Technon® PM powder comprises a minimum of about 92.5% tungsten (W), a maximum of about 3.0% iron (Fe), a maximum of about 5.0% nickel (Ni), a maximum of about 0.50% molecular oxygen (O$_2$) and a maximum of about 2.0% other elements (total). Particle sizes for Technon® PM powder are 40 microns or larger for at least about 90% of the particles, and at least about 90% of the particles are between 100 and 400 Mesh. Technon® PM powder has a bulk density of about 17.00 g/cm$^3$ or greater (helium pycnometer measurement) and a tap density of about 10.50 g/cm$^3$ or greater (ASTM B527 measurement).

Lead, as a practical alloy for use with fishing tackle applications, has a density of about 10.5 g/cm$^3$, though many commonly used alloys have a density of 9 g/cm$^3$ or less. Generally, tungsten powder has a density of about 12 g/cm$^3$ or more. Therefore, fishing tackle articles having a greater density than those using conventional lead weighting can be achieved according to the present invention. This allows for greater flexibility in tackle design. For example, high-density weighting according to the present invention allows fishing tackle articles to have smaller sizes and smaller surface areas, which can reduce undesired fluid drag. Moreover, tungsten powder distributed in a soft polymer binder material can create a high-density fishing tackle article that is soft and pliable, which can provide a more desired texture. Particles of the distributed tungsten powder are so small as to be virtually undetectable by fish, and a compound made from a tungsten powder filler and a binder material can substantially maintain the textural properties of the binder material. Such consistent textures can increase the effectiveness of such tackle.

Figure 1A:
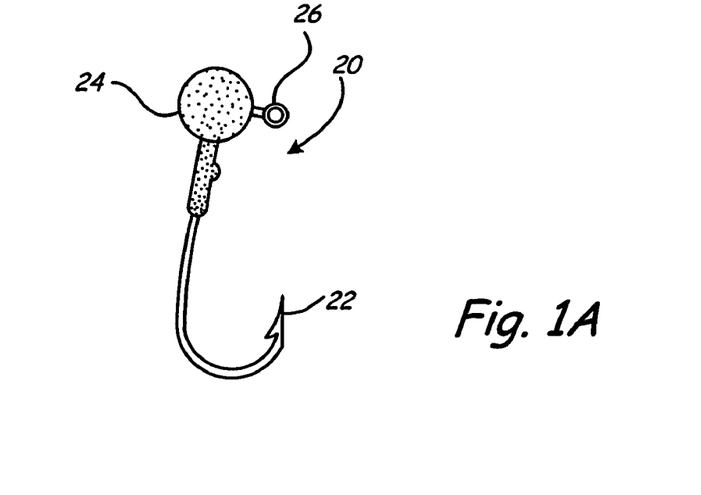
FIG. 1A is a side view of a jig according to the present invention.

The following are some examples of fishing tackle articles that utilize a distributed tungsten weighting material. FIG. 1A is a side view of a jig 20 that includes a hook 22 and a weight 24 (or jig body). The hook 22 is a conventional single-barb hook having an eyelet 26 for attachment to a line (not shown), although other types of hooks can be used in further embodiments. The spheroidal weight 24 is engaged to the hook 22 near its eyelet 26. In further embodiments, the hook 22 can include a barb, loop or other structure for retaining the weight 24 in a desired portion. The particular size, shape and overall weight of the jig 20 can vary as desired.

The weight 24 is formed of a material that includes a soft polymer material (e.g., a conventional "soft plastic" bait material) and a tungsten weighting material distributed therein. Additional materials for providing color, scent, glitter or other features can also be utilized with the weight 24. The soft polymer material acts as a relatively low-density binding agent to hold the tungsten weighting material in suspension therein. In alternative embodiments, other types of binding agents other than polymers can be used, such as latex and natural resins. The weight 24 is generally soft and pliable, and is hook-pierceable. As shown in FIG. 1A, the weight 24 is uniformly weighted, with the tungsten weighting material substantially evenly distributed throughout the binder material.

The particular density and texture of the weight 24 can vary as desired. In order to make the weight 24 of the jig 20 with a soft and pliable texture, the weight 24 can be made from a Technon® Plus tungsten powder combined with a conventional soft plastic material. Alternatively, the weight 24 can have a relatively hard texture. In order to make the weight 24 of the jig 20 with a hard texture, the weight 24 can be made of a Technon® Ultra tungsten powder combined with a relatively hard binding material, such as harder polymers or other hard binding agents. Increasing the hardness of the weight 24 can also increase its mass, producing densities of 10.5 g/cm$^3$ or more.

In order to fabricate the jig 20, the hook 22 can be placed in the mold and the soft weight 24 molded around the hook 22. Alternatively, the weight 24 can be molded separately and the hook 22 inserted through the weight 24 by piercing it with the point of the hook 22 and sliding the weight 24 to a desired position near the eyelet 26.

It is possible to form the weight 24 by hand-poured molding, injection molding, rotational molding, or other suitable processes. For example, the weight 24 can be made using a conventional fishing tackle mold (e.g., a DO-IT® brand mold available from Do-It Corp., Denver, Iowa). The soft polymer binder material and the tungsten weighting material can be pre-mixed or mixed together during the molding process. It is possible to enhance mold distribution of the soft polymer binder and the tungsten weighting material by pre- and/or post-heating the mold and by slowing molding cycle times. This decreases viscosity and allows more dense material mixtures to flow in the mold and out of the sprue (i.e., the feed line(s) to the main cavity of the mold). A temperature of about 162.78° C. (325° F.) is sufficient in most cases to provide adequate flow of the soft plastic material for molding.

Figure 1B:
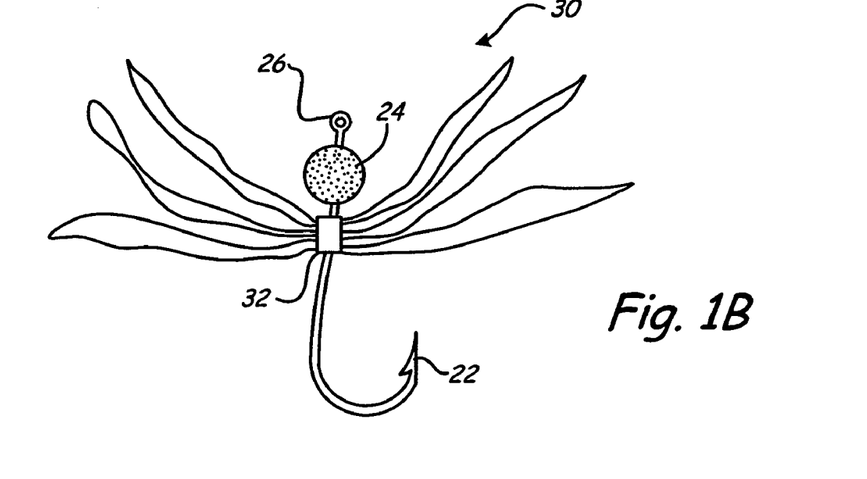
FIG. 1B is a side view of an alternative embodiment of a jig.

The structures, materials and manufacturing methods utilized with the jig 20 are readily adaptable to a variety of other fishing tackle articles. FIG. 1B is a side view of an alternative embodiment of a jig 30. The jig 30 is similar to the jig 20 shown and described with respect to FIG. 1A, but further includes a conventional skirt 32 engaged to the hook 22. It should be recognized, in view of FIG. 1B, that a soft weight can be readily adapted to a number of different jigs and lures. For instance, a relatively small soft weight that is hook-pierceable can be used in a similar fashion with a fly for fly fishing in a similar manner.

Figure 2:
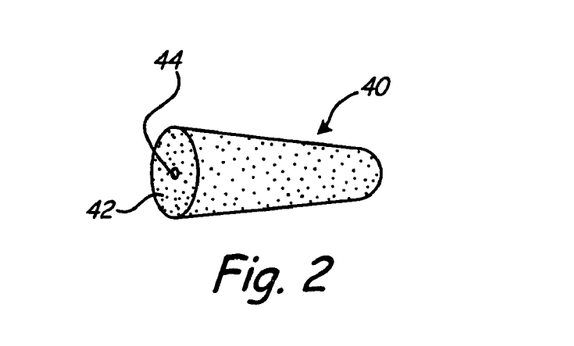
FIG. 2 is a perspective view of a bullet weight.

FIG. 2 is a perspective view of a bullet weight 40 that is made of a soft polymer material having a distributed tungsten weighting material suspended therein. Typically, the tungsten weighting material is evenly distributed through the weight 40. The weight 40 has a conventional conical or frustoconical bullet-like shape. A rear portion 42 can be concave. An optional opening 44 extends lengthwise through the center of the weight 40, and permits the weight 40 to be threaded onto a fishing line in a conventional manner. In further embodiments, the opening 44 is omitted and the weight 40 is pierced by a hook before being threaded onto a line. By omitting the opening 44, the weight has a "self-pegging" effect that can hold the weight at a desired position on the line (similar to the weight 24 positioned on the hook 22 in FIG. 1B).

The bullet weight 40 can be made using molding processes similar to those described above.

Figure 3:
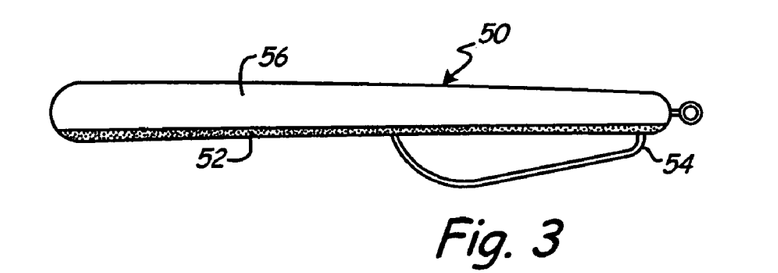
FIG. 3 is a side view of a soft plastic bait having a weighted portion and having a hook engaged thereto.
Figure 4:
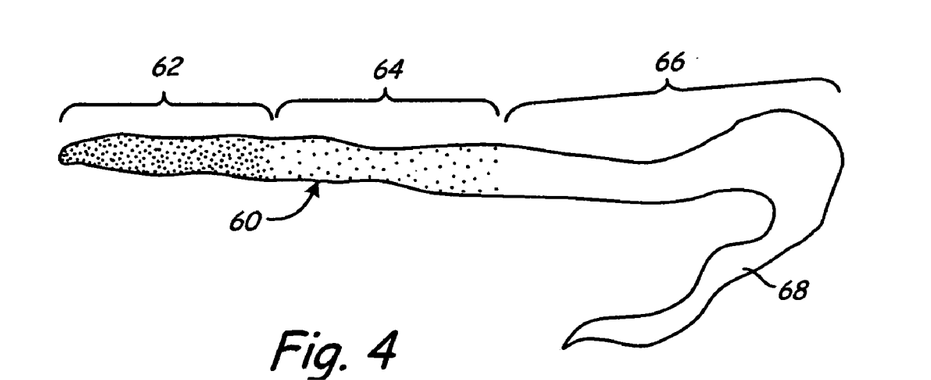
FIG. 4 is side view of an alternative embodiment of a soft plastic bait having two different weighted portions.

FIGS. 3 and 4 are examples of weighted soft plastic baits according to the present invention. These embodiments are provided merely as examples, and in further embodiments can be applied to baits that resemble worms, tubes, flukes, leaches, minnows, creatures, etc. FIG. 3 is a side view of a tube-shaped soft plastic bait 50 having a weighted portion 52 and having a hook 54 engaged thereto in a "weedless" arrangement. The bait 50 is made of a soft plastic material, and the weighted portion 52 includes a distributed tungsten weighting material suspended in the soft plastic material. In the embodiment shown in FIG. 3, the weighted portion 52 extends along the entire length of a lower (i.e., belly) portion of the bait 50. The bait 50 also includes a portion 56 without a tungsten weighting material (i.e., an unweighted portion). The weighted portion 52 has a greater average density than the unweighted portion 56. The particular weighting scheme, that is, the particular arrangement and characteristics of the weighted portion 52 can be selected to achieve desired performance. For instance, the weighted portion 52 can be arranged to provide desired buoyancy and a desired falling (i.e., sinking) orientation.

The bait 50 can be made, for example, by introducing a mixture of soft plastic binder material and tungsten weighting material into a portion of an open mold (corresponding to the weighted portion 52 of the bait 50) and allowing the mixture to solidify. Then the mold can be closed and filled with an unweighted soft plastic material. Other types of manufacturing processes can also be used. The hook 54 can be engaged by piercing the bait 50 in manner well-known with the use of soft plastic fishing baits and lures.

Baits 40 and 50 permit the use of unique weighting schemes, which can enhance presentation of the baits when in use and facilitate casting the bait with a fishing pole. In addition, the incorporation of weighting directly into the body of the bait can eliminate the need for separate weights. The elimination of separate weights enhances the weedless properties of a rigged bait, because separate weights present risks of snagging on weed and other obstacles.

FIG. 4 is side view of an alternative embodiment of a soft plastic bait 60 having a first weighted portion 62, a second weighted portion 64 and an unweighted portion 66. The bait 60 is shaped like a worm, and has a tail 66. The bait 60 is made of a soft plastic material, and the first and second weighted portions 62 and 64 each include a distributed tungsten weighting material suspended in the soft plastic material. As shown in FIG. 4, the tungsten weighting material is relatively evenly distributed in each of the first and second weighted portions 62 and 64, with the first weighted portion 62 having a greater average density than the second weighted portion 64. The unweighted portion 66 comprises soft plastic material without tungsten weighting material suspended therein, and therefore has a lesser average density than the first and second weighted portions 62 and 64. The bait 60 can be made by sequentially filling a mold with (a) mixtures of soft plastic material and tungsten weighting material and (b) unweighted soft plastic material to form the desired weighted and unweighted portions of the bait 60. The mold can be allowed to cool between the sequential additions of material in order to maintain differentiation between portions of different densities.

In alternative embodiments, one or more portions of the bait 60 can have a density gradient. In other words, the density of the bait 60 can vary at a selected rate across a particular dimension of the bait 60. For example, the second weighted portion 64 can have a density that gradually increases along the length of the bait 60 from the unweighted portion 66 to the first weighted portion 62. The density can increase at a linear rate, or follow a more complex pattern.

Figure 5:
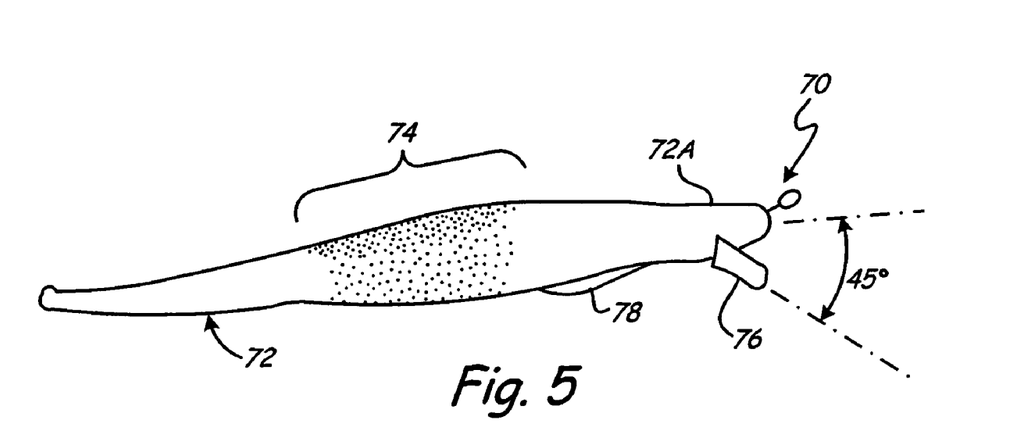
FIG. 5 is a side view of a soft-bodied crank bait having a weighted portion.

FIG. 5 is a side view of a soft-bodied crank bait 70, which includes a fluke-shaped body 72 having a weighted portion 74. A conventional rigid bill 76 is provided at a front portion 72A of the body 72 to facilitate a wiggling, fish-attracting motion as the crank bait 70 is pulled through or across water. A wide-gap single-barb hook 78 is engaged with the body 72 in a "weedless" configuration. The bill 76 can optionally have a hole (not shown) through which the hook 78 can be inserted to better secure the bill 76 and increase the durability of the crank bait 70. In one embodiment, the bill 76 is 0.9525 cm (0.375 in.) by 1.5875 cm (0.625 in.) and is positioned at a 45° angle with respect to a centerline of the bait 70.

The body 72 is made of a soft plastic material, and the weighted portion 74 includes a distributed tungsten weighting material. It may be preferable in some applications to provide weighting material gradation and/or symmetrical weighting in order to promote straight tracking of the crank bait 70 in use. However, the particular weighting scheme can vary as desired.

The crank bait 70 can be formed by molding the body 72 first and inserting the bill 76 and the hook 78 into the body 72. Alternatively, body 72 can be molded about the bill 76 and/or hook 78. Moreover, treble hooks and other types of hooks and hook arrangements can be used.

Figure 6:
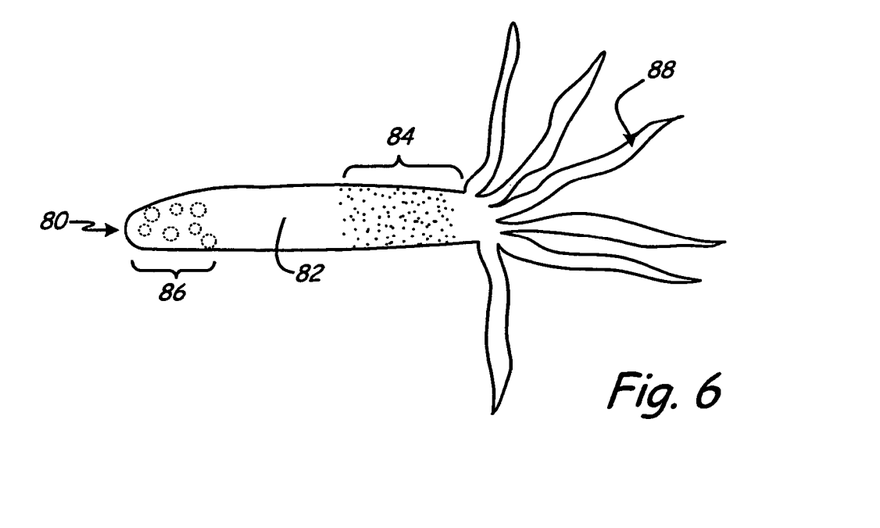
FIG. 6 is a side view of a soft-bodied bait having a weighted portion and a highly buoyant portion.

FIG. 6 is a side view of a soft-bodied bait 80 having a body 82 with weighted portion 84 and a highly buoyant portion 86. The bait 80 further includes a multi-element tail 88. The body 82 can comprise a soft plastic material, with a distributed tungsten weighting material suspended in the weighted portion 84 and microballons (e.g., Sil-Cel brand spherical microballons available from Eager Plastics, Inc., Chicago, Ill. and Eccospheres® available from CRP Balmoral, Inc., Houston, Tex.) suspended in the highly buoyant portion 86. The microballoons are utilized to decrease the density of a material to selectively increase the buoyancy of at least a portion of the bait 80. The weighted portion 84 and the highly buoyant portion 86 are located at selected regions along the body 82 to provide a desired falling or floating orientation. For instance, the highly buoyant portion 86 can be located near a nose portion where a line can be attached, and the weighted portion 86 can be located near the tail 88. This weighting scheme can allow the tail 88 to have a more downward orientation as the bait 80 sinks, which can help the elements of the tail 88 to flare out in a desirable presentation. In further embodiments, additional weighted and/or highly buoyant portions can be included in a variety of arrangements.

Figure 7:
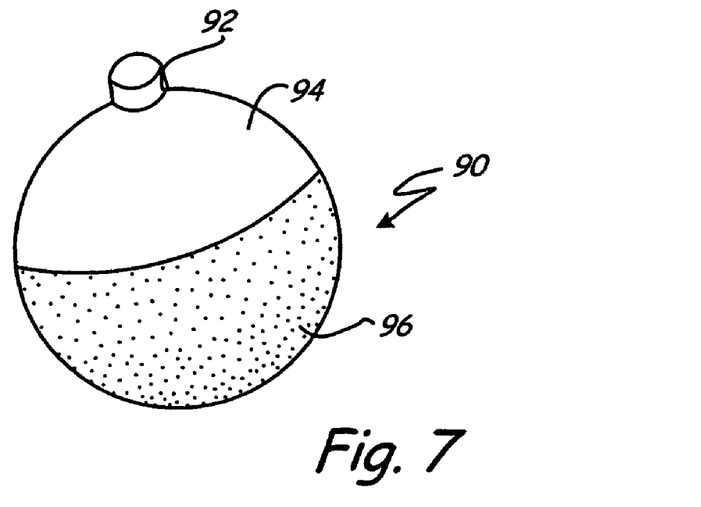
FIG. 7 is a perspective view of a bobber having a weighted portion.

FIG. 7 is a perspective view of a bobber 90 that includes a line connection mechanism 92, an unweighted portion 94 and a weighted portion 96. The bobber 90 has a conventional spherical bobber shape forming a hollow cavity inside, and is constructed in two parts. The first part includes the unweighted portion 94, which is made of a relatively hard polymer material. The second part includes the weighted portion 96, which is made of a relatively hard polymer binder material with a tungsten weighting material distributed therein. The bobber 90 can be attached to a fishing line to help indicate fish strikes. The weighted portion 96 helps promote a desired orientation of the bobber 90, with the weighted portion 96 oriented below the unweighted portion 94. Depending on the density of the weighted portion 96 and the volume of the hollow cavity inside the bobber 90, the buoyancy of the bobber 90 can be selected so that the bobber will float on the surface of a body of water or be at least partially submerged in the water.

The bobber 90 can further include scent, color, noise-makers, and other features as desired. It should also be recognized that the bobber 90 can have other configurations in further embodiments. For example, the bobber 90 can be a slip bobber or other known types of bobbers.

In another aspect of the present invention, a weighting substance is provided that can be applied to existing fishing tackle articles to add mass. Use of such a weighting substance permits custom weighting of an existing fishing tackle article, and facilitates simply and quickly adjusting the weighting of the tackle article. This weighting substance includes a binder material and a distributed tungsten weighting material. For example, the binder material can be a commercially available gel-form fish attractant (e.g., MegaStrike™ brand gel-form fish attractant) or other scented or unscented gel. The specific types and amounts of binder material and tungsten weighting material used can vary as desired. In one exemplary embodiment, the weighting substance comprises, by volume, 65% MegaStrike™ brand gel-form fish attractant and 35% Technon® PM tungsten powder. The weighting substance can further include additional materials, such as colorings, scents, glitters, and other substances.

The weighting substance can be pre-mixed and stored in a container, which can include a nozzle or other suitable dispensing means. The weighting substance can then be dispensed from the container as needed. It is possible to provide a number of different containers that each hold different mixtures of the weighting substance. For example, one container can hold a high-density unscented weighting substance and another can hold a lower-density scented weighting substance.

The weighting substance according to the present invention can be utilized for a number of different applications. The following are selected examples, though further embodiments are contemplated.

Figure 8:
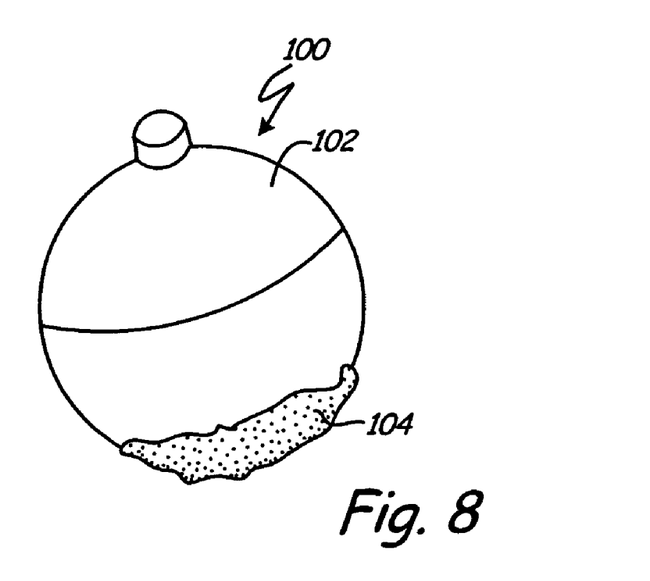
FIG. 8 is a perspective view of a bobber having a weighting material disposed on a surface thereof.

FIG. 8 is a perspective view of a conventional hollow, hard plastic bobber 100 having an exterior surface 102 with a weighting material 104 disposed thereon. The weighting substance 104 allows custom weighting modifications to a conventional bobber 100, to adjust buoyancy, casting properties (i.e., to facilitate casting with a fishing pole), and operational orientation.

Figure 9:
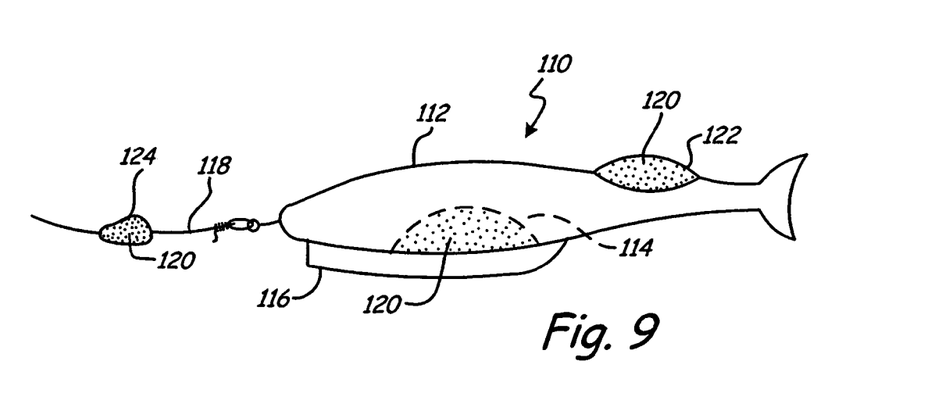
FIG. 9 is a side view of a fishing tackle article having a weighting material disposed in a cavity thereof and on a surface thereof.

FIG. 9 is a side view of a minnow-shaped fishing bait 110, which includes a body 112 having a cavity 114 therein. The body 112 is made of a soft-plastic material, although in further embodiments the body can be made of a relatively hard material. A hook 116 is engaged to the body 112 of the bait 110 in a weedless configuration, and a line 118 is connected to the hook 116. A weighting substance 120 is disposed in the cavity 114, at a surface location 122 on the exterior of the body 112, and in a bead 124 on the line 118. The weighting substance 120 comprises a gel-form base material (binder), such as MegaStrike™ brand gel-form fish attractant, and a distributed tungsten powder suspended therein.

The weighting substance 120 disposed in the cavity 114 and on the surface location 122 can be used to selectively weight the bait 110 in order to provide desired characteristics, for example, falling characteristics, tracking characteristics (as the bait 110 is pulled through water), and buoyancy characteristics. The particular locations where the weighting substance 120 is placed, and the particular amounts of weighting substance 120 utilized will vary according to the particular application.

FIG. 9 shows a bead 124 of the weighting substance 20 placed on the line 118. This bead can be used like a fixed weight, and can also function as a stop for a bobber (not shown). The weighting substance used to form the bead 124 can utilize a more solid binder material, in order to better secure the bead 124 to the line 118.

Figure 10:
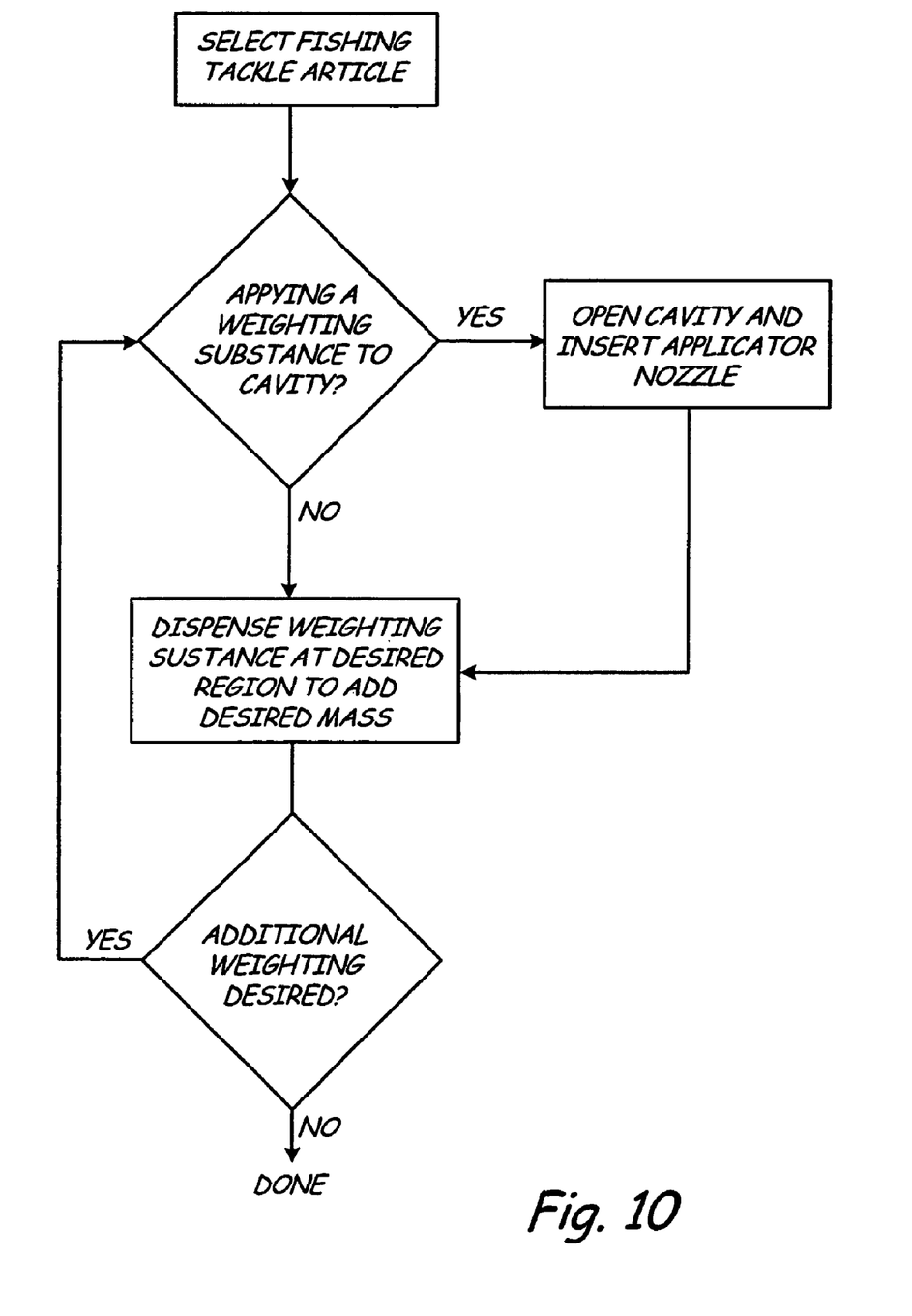
FIG. 10 is a flow chart of a method for weighting a fishing tackle article according to the present invention.

FIG. 10 is a flow chart of a method for weighting a fishing tackle article according to the present invention. As shown in FIG. 10, a fishing tackle article is first selected for weighting.

Any type of fishing tackle article, including lures, baits, bobbers and weights can be selected. Next, it is determined if the tackle article has a cavity. If so, the weighting substance can be optionally applied within the cavity region by opening the cavity and inserting a dispenser (i.e., a nozzle of a container holding the weighting substance, such as that shown in FIG. 11) to dispense a desired amount of the weighting substance. If the tackle article does not have a cavity, the weighting substance can be applied to a surface region of the article. This process can be repeated to apply additional weighting substance to other regions, as desired.

Figure 11:
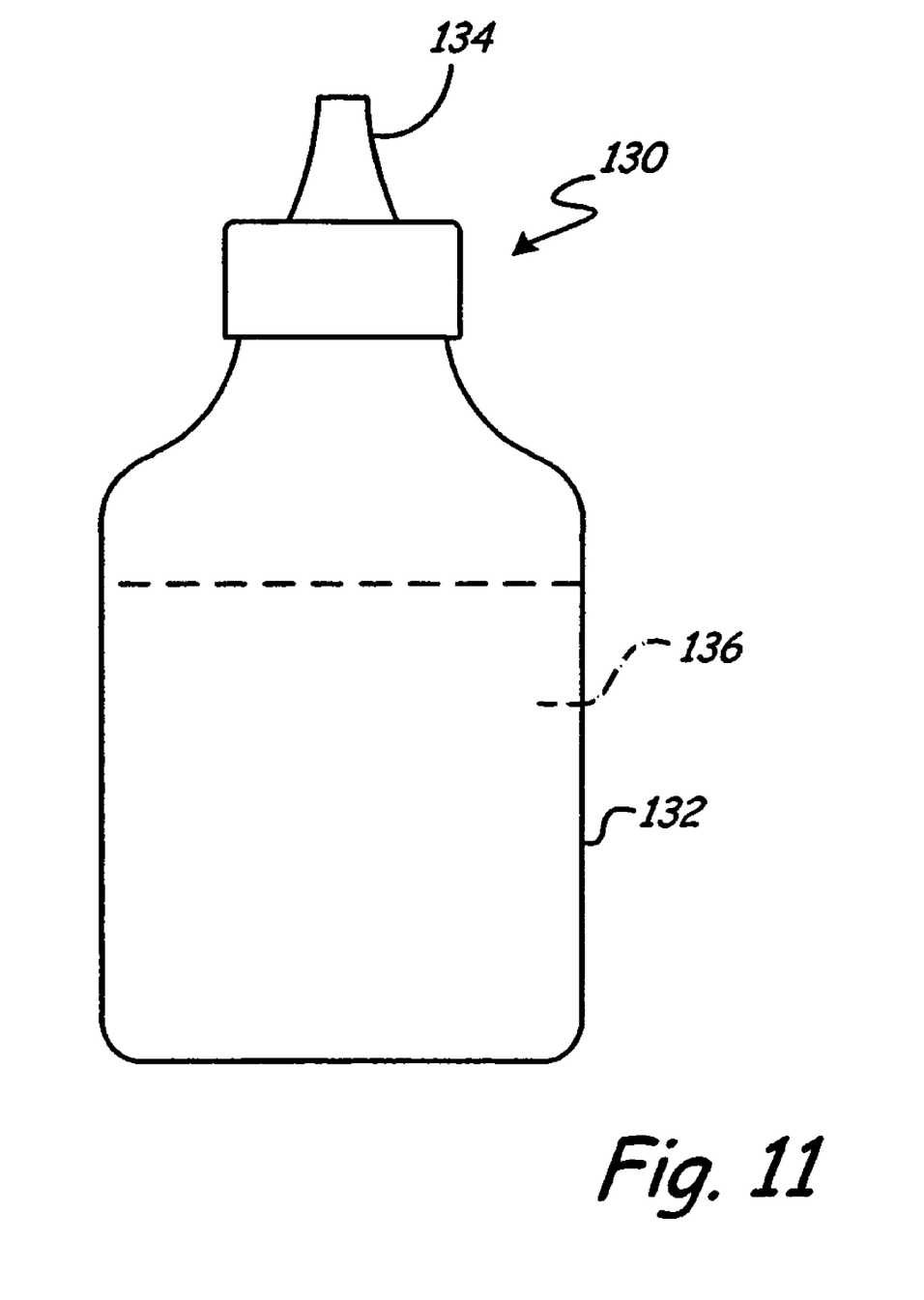
FIG. 11 is a front view of a container of a weighting substance according to the present invention.

FIG. 11 is a front view of an exemplary dispenser 130, which includes a squeezable container body 132 and a nozzle 134 connected to the container body 132. The container body 132 is hollow, with an interior cavity for holding a volume of a weighting substance 136. The weighting substance 136 can be dispensed through the nozzle 134, and can be forced from the nozzle 134 by squeezing the container body 132. The dispenser 130 can be used to weight fishing tackle articles in the manner shown and described with respect to FIG. 10.

The present invention provides numerous benefits. As discussed above, tungsten weighting materials are substantially non-toxic, and can have a relatively high density. Tungsten is also a material that is not susceptible to undesirable decay, like rusting. In addition, the present invention can facilitate changing weighting schemes without the need to retying a fishing line. Changing a bullet weight or crank bait, for example, requires cutting the line and retying with the new weight or lure in place. That is a burdensome process. However, according to the present invention, soft weighted baits according to the present invention can be changed on a hook that remains tied to a line, which can save time and effort. Moreover, a weighting substance can be applied to an existing tackle article to provide custom, adaptable weighting.

Although the present invention has been described with reference to preferred embodiments, workers skilled in the art will recognize that changes may be made in form and detail without departing from the spirit and scope of the invention. For example, the articles and methods described above can be adapted to nearly any type of fishing tackle article.

The invention claimed is:

1. A weighting material for use with fishing tackle, the weighting material comprising:
   a gel base material; and
   a distributed metallic filler material suspended in the gel base material, wherein the distributed metallic filler material comprises a tungsten powder, wherein the tungsten powder comprises particles having a size of about 100 to about 400 mesh, wherein the distributed metallic filler material comprises about 35% by volume of the weighting material, and wherein both the gel base material and the metallic filler material are substantially non-toxic.

2. The weighting material of claim 1, wherein the tungsten powder contains at least about 92.5% tungsten.

3. The weighting material of claim 1, wherein the gel base material is a gel form fish attractant.

* * * * *